(12) United States Patent
Fukumoto

(10) Patent No.: US 8,675,143 B2
(45) Date of Patent: Mar. 18, 2014

(54) TELEVISION SET

(75) Inventor: Yasuyuki Fukumoto, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 127 days.

(21) Appl. No.: 13/028,549

(22) Filed: Feb. 16, 2011

(65) Prior Publication Data

US 2011/0205455 A1 Aug. 25, 2011

(30) Foreign Application Priority Data

Feb. 19, 2010 (JP) .................................. 2010-35184

(51) Int. Cl.
*H04N 13/00* (2006.01)
(52) U.S. Cl.
USPC ............... 348/843; 345/87; 349/58; 348/836
(58) Field of Classification Search
USPC ................................................ 348/836–843
See application file for complete search history.

(56) References Cited

U.S. PATENT DOCUMENTS

| | | | |
|---|---|---|---|
| 6,020,867 A * | 2/2000 | Shimada et al. | 345/87 |
| 8,228,446 B2 | 7/2012 | Fujikawa | |
| 2008/0068531 A1* | 3/2008 | Tomikawa | 349/58 |
| 2009/0141199 A1* | 6/2009 | Fujikawa | 348/836 |
| 2009/0163321 A1* | 7/2009 | Kataoka et al. | 361/679.22 |
| 2009/0268108 A1* | 10/2009 | Hamada | 348/836 |

FOREIGN PATENT DOCUMENTS

| | | | |
|---|---|---|---|
| JP | 6-44129 Y2 | 11/1994 | |
| JP | 9-238293 A | 9/1997 | |
| JP | 2008-78745 A | 4/2008 | |
| JP | 2008-154084 A | 7/2008 | |

* cited by examiner

*Primary Examiner* — Dave Czekaj
*Assistant Examiner* — Md Haque
(74) *Attorney, Agent, or Firm* — Crowell & Moring LLP

(57) ABSTRACT

This television set includes a front housing, a first board mounted on the front housing, having a first connecting portion, a rear housing, and a second board mounted on the rear housing, having a second connecting portion connected to the first connecting portion, while the rear housing includes an exposing portion for exposing at least the first connecting portion in a state of being mounted to the front housing.

18 Claims, 11 Drawing Sheets

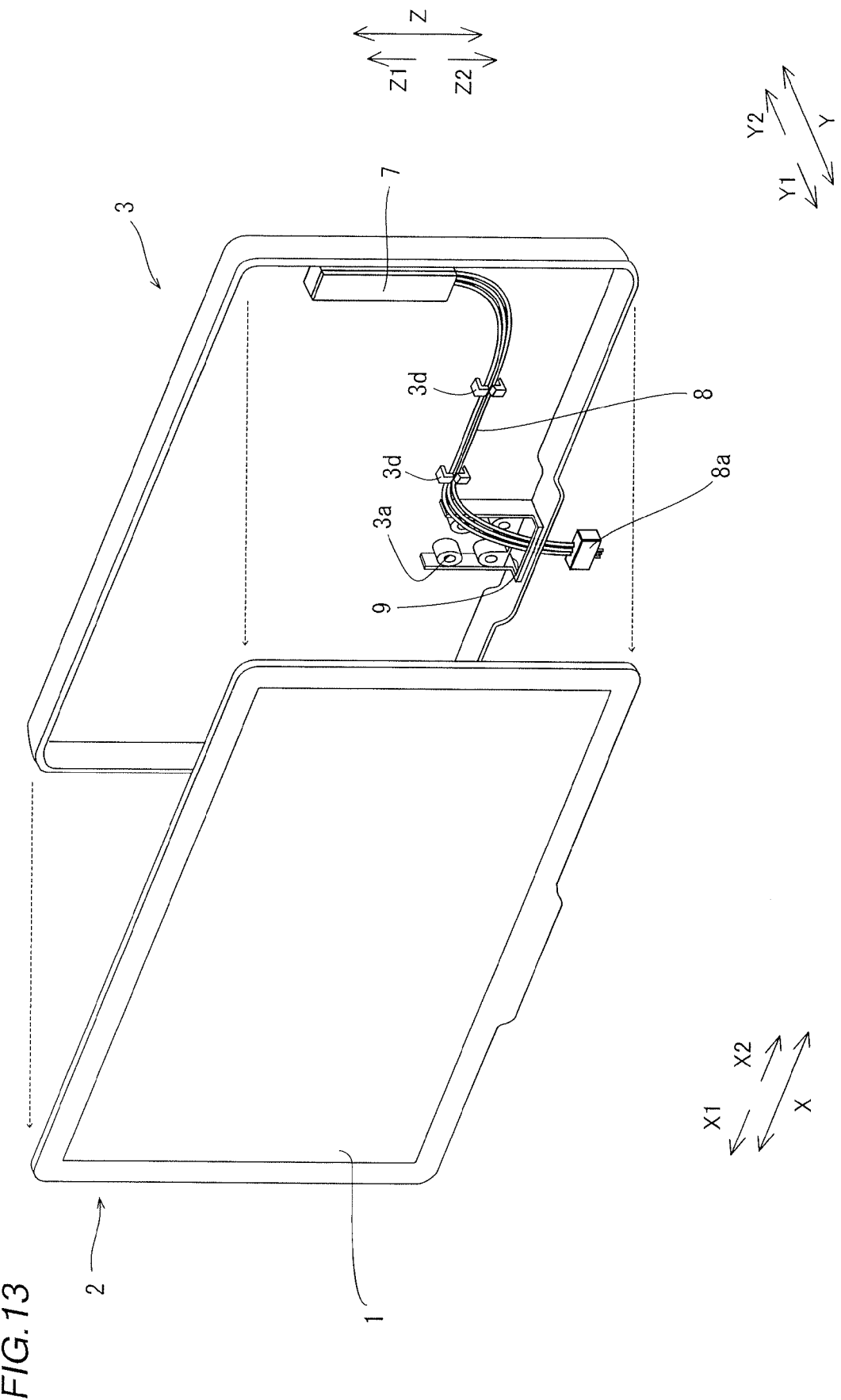

TELEVISION SET

BACKGROUND OF THE INVENTION

1. Field of the Invention

The present invention relates to a television set, and more particularly, it relates to a television set mounted with a board on a front housing.

2. Description of the Background Art

A television set mounted with a board on a front housing is known in general, as disclosed in Japanese Patent Laying-Open No. 2008-78745, for example.

The aforementioned Japanese Patent Laying-Open No. 2008-78745 discloses a television set comprising a front housing so arranged that a display portion capable of displaying television broadcasting is exposed on a front surface of the front housing, a sensor board including a remote photoreceiving portion mounted on a back surface of the front housing and a rear housing mounted to the front housing. In general, a television set is provided with various boards, and the boards are connected with each other through a cable or the like. Also in the television set according to the aforementioned Japanese Patent Laying-Open No. 2008-78745, the sensor board mounted on the back surface of the front housing is conceivably connected with another board through a cable or the like.

In the television set according to the aforementioned Japanese Patent Laying-Open No. 2008-78745, however, when another board connected to the sensor board mounted on the back surface of the front housing is mounted on a front surface of the rear housing, another board cannot be connected to the sensor board before assembling the housing, and hence the sensor board mounted on the back surface of the front housing and another board mounted on the front surface of the rear housing cannot be disadvantageously easily connected with each other.

SUMMARY OF THE INVENTION

The present invention has been proposed in order to solve the aforementioned problems, and an object of the present invention is to provide a television set having a board mounted on a back surface of a front housing and a board mounted on a front surface of a rear housing capable of being easily connected with each other.

A television set according to an aspect of the present invention comprises a front housing so arranged that a display portion capable of displaying television broadcasting is exposed on a front surface side, a first board mounted on a back surface of the front housing, having a first connecting portion, a rear housing mounted to the front housing, and a second board mounted on a front surface of the rear housing, having a second connecting portion connected to the first connecting portion, wherein the rear housing includes an exposing portion formed by an opening or a notch for exposing at least the first connecting portion of the first board in a state of being mounted to the front housing.

In the television set according to the aspect of the present invention, as hereinabove described, the exposing portion formed by the opening or the notch for exposing at least the first connecting portion of the first board in a state of being mounted to the front housing is provided on the rear housing, whereby the second connecting portion of the second board can be connected to the first connecting portion of the first board exposed through the exposing portion from outside a housing even after the front housing and the rear housing are mounted to each other, and hence the board mounted on the back surface of the front housing and the board mounted on the front surface of the rear housing can be easily connected with each other.

In the aforementioned television set according to the aspect, the second connecting portion preferably includes a connecting wire and a connector portion both for connecting to the first connecting portion, and the exposing portion is preferably so formed that at least the connector portion can be drawn to an outside. According to this structure, at least the connector portion can be drawn to the outside through the exposing portion when mounting the front housing and the rear housing to each other, and hence the connector portion can be easily connected to the first connecting portion of the first board exposed through the exposing portion from the outside after the front housing and the rear housing are mounted to each other.

In this case, the exposing portion is preferably so formed that the connecting wire and the connector portion can be drawn to the outside. According to this structure, not only the connector portion but also the connecting wire can be drawn to the outside through the exposing portion when mounting the front housing and the rear housing to each other, and hence the connector portion can be more easily connected to the first connecting portion of the first board exposed through the exposing portion from the outside after the front housing and the rear housing are mounted to each other.

In the aforementioned television set having the exposing portion so formed that the connecting wire and the connector portion can be drawn to the outside, the first connecting portion is preferably formed to be capable of receiving the connector portion drawn to the outside through the exposing portion from the outside. According to this structure, the first connecting portion exposed through the exposing portion simply receives the connector portion drawn to the outside, whereby the connector portion and the first connecting portion can be connected with each other, and hence the connector portion and the first connecting portion can be easily connected with each other.

In this case, the first connecting portion is preferably formed to be capable of receiving the connector portion drawn to the outside through the exposing portion from the outside along a direction substantially perpendicular to an exposed surface of the first board. According to this structure, the connector portion drawn to the outside can be received straight from the front surface side with respect to the exposed surface of the first board exposed through the exposing portion, and hence the connector portion can be easily connected to the first connecting portion.

In the aforementioned television set according to the aspect, the exposing portion is preferably formed by an opening, and the opening is preferably substantially identical in size to the first board as viewed from a back surface side of the rear housing. According to this structure, a large space for the work of connecting the second connecting portion of the second board and the first connecting portion of the first board with each other can be secured after mounting the front housing and the rear housing to each other, as compared with a case where the opening is so formed that only the first connecting portion of the first board is exposed as viewed from the back surface side of the rear housing. Consequently, the second connecting portion of the second board and the first connecting portion of the first board can be easily connected with each other after mounting the front housing and the rear housing to each other. When the opening is unduly increased in size, a foreign substance or the like may invade through the opening at the work of connecting the second connecting portion of the second board and the first connecting portion of the first board with each other. In this case, according to the present invention, the opening is formed to be substantially identical in size to the first board as viewed from the back surface side of the rear housing, whereby the invasion by a foreign substance or the like through the opening at the connection work can be inhibited while facilitating the connection between the second connecting portion of the second board and the first connecting portion of the first board after mounting the front housing and the rear housing to each other.

In this case, the opening is preferably formed astride a back surface and a bottom surface of the rear housing. According to this structure, a large space for the work of connecting the second connecting portion of the second board and the first connecting portion of the first board with each other can be secured after mounting the front housing and the rear housing to each other, as compared with a case where the opening is formed on only either the back surface or the bottom surface of the rear housing. Consequently, the second connecting portion of the second board and the first connecting portion of the first board can be easily connected with each other after mounting the front housing and the rear housing to each other.

The aforementioned television set according to the aspect preferably further comprises a stand mounted to at least either the front housing or the rear housing, formed to cover the exposing portion in a mounted state. According to this structure, the exposing portion is covered by the stand, whereby the invasion by a foreign substance or the like through the exposing portion can be prevented and the exposing portion can be prevented from standing out, while facilitating the connection between the board mounted on the back surface of the front housing and the board mounted on the front surface of the rear housing through the exposing portion.

In this case, the stand is preferably formed to be mounted to the rear housing. According to this structure, the stand can be mounted to the television set while inhibiting complication of the structure of the front housing provided with the display portion or the like.

In the aforementioned television set comprising the stand, the exposing portion is preferably formed by an opening, and the rear housing preferably includes a stand mounting portion formed at a position where the exposing portion formed by the opening is provided, mounted with the stand. According to this structure, the stand mounting portion is not required to be formed separately at a position different from the position where the exposing portion of the rear housing is provided, and hence the stand can be mounted to the rear housing while inhibiting complication of the structure of the rear housing.

In this case, the stand mounting portion is preferably formed in a recessed shape. According to this structure, a backward protrusion from the back surface of the rear housing at a mounting portion can be reduced when mounting the stand on the stand mounting portion, and hence a thickness of a body of the television set can be reduced.

In the aforementioned television set comprising the stand, the exposing portion is preferably arranged on a lower end of the rear housing, and the stand is preferably mounted to cover the exposing portion. According to this structure, the television set can be stably supported by the stand mounted on the lower end of the rear housing, while covering the exposing portion.

In this case, the exposing portion is preferably arranged on a central portion of the lower end of the rear housing. According to this structure, the television set can be stably supported by the stand mounted on the central portion of the lower end of the rear housing where the center of gravity of the housing is located, while covering the exposing portion.

In the aforementioned television set according to the aspect, the second connecting portion preferably includes a connecting wire and a connector portion both for connecting to the first connecting portion, and the rear housing is preferably provided with a stop portion for fixing a wiring path of the connecting wire. According to this structure, the stop portion can inhibit the connecting wire for connecting to the first connecting portion from deviating from a desired wiring path.

In this case, the stop portion is preferably integrally provided on the rear housing. According to this structure, the stop portion integrally provided on the rear housing can inhibit the connecting wire for connecting to the first connecting portion from deviating from a desired wiring path without any additional component.

In the aforementioned television set having the stop portion provided on the rear housing, the stop portion is preferably formed by a pair of upper and lower claw members and formed to fix the wiring path of the connecting wire by regulating anteroposterior and vertical movement of the connecting wire. According to this structure, the stop portion formed by the pair of upper and lower claw members regulating the anteroposterior and vertical movement of the connecting wire can reliably inhibit the connecting wire for connecting to the first connecting portion from deviating from a desired wiring path.

In the aforementioned television set according to the aspect, the first board is preferably a sensor board including a remote photoreceiving portion, and the second board is preferably a switching board loaded with a plurality of switches including a switch for operating a power supply. According to this structure, the sensor board and the switching board can be easily connected with each other in a structure in which the remote photoreceiving portion is provided on the front housing while the switch for operating a power supply is provided on the rear housing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a perspective view for illustrating the procedure of assembling the housing of the liquid crystal television set according to the embodiment of the present invention.

DESCRIPTION OF THE PREFERRED EMBODIMENTS

An embodiment of the present invention is now described with reference to the drawings.

The structure of a liquid crystal television set according to an embodiment of the present invention is described with reference to FIGS. 1 to 12.

Figure 1:
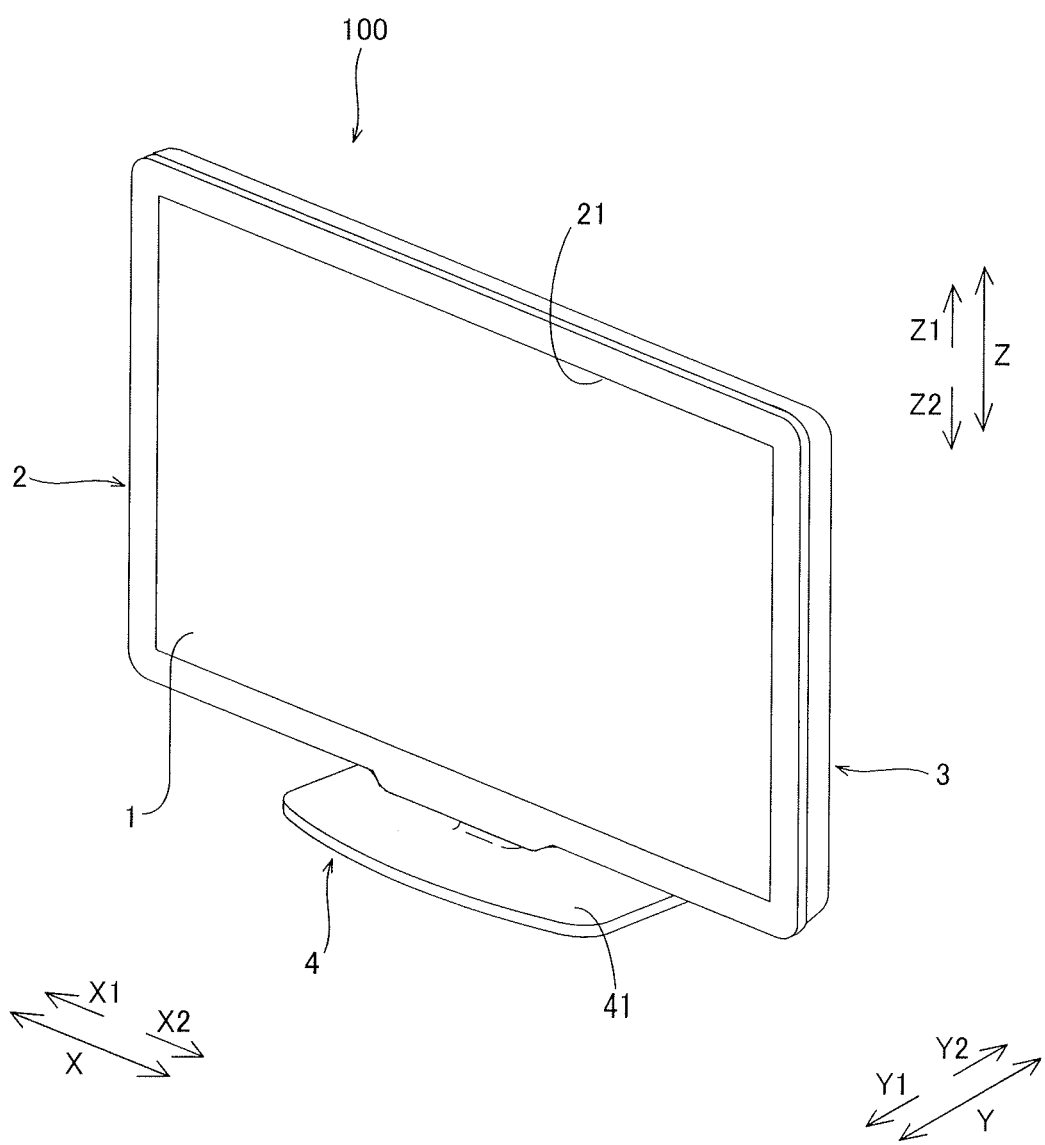
FIG. 1 is a perspective view showing the overall structure of a liquid crystal television set according to an embodiment of the present invention.

The liquid crystal television set 100 according to the embodiment of the present invention comprises a display portion 1 displaying television broadcasting, a front cabinet 2, a rear cabinet 3 and a stand 4, as shown in FIG. 1. The liquid crystal television set 100 is an example of the "television set" in the present invention. The front cabinet 2 is an example of the "front housing" in the present invention, and the rear cabinet 3 is an example of the "rear housing" in the present invention.

The display portion 1 is constituted by a liquid crystal panel module and formed to be capable of displaying an image on a display surface located on a front surface side (a side in the direction Y1). The display portion 1 has a substantially rectangular shape in front elevational view (as viewed from a direction Y1), as shown in FIG. 1.

The front cabinet 2 is arranged on the front surface side of the liquid crystal television set 100 (the side of the liquid crystal television set 100 in the direction Y1), as shown in FIG. 1. More specifically, the front cabinet 2 is arranged closer to the front surface side than the rear cabinet 3 (on a side of the rear cabinet 3 in the direction Y1). The front cabinet 2 is formed by a resin member and formed to support the display portion 1. The front cabinet 2 is formed in a frame shape. More specifically, the front cabinet 2 has an opening 21 for exposing the display portion 1. The front cabinet 2 is mounted with a sensor board 6 including a photoreceiving portion for receiving a signal transmitted from a remote control (not shown), as described later.

Figure 3:
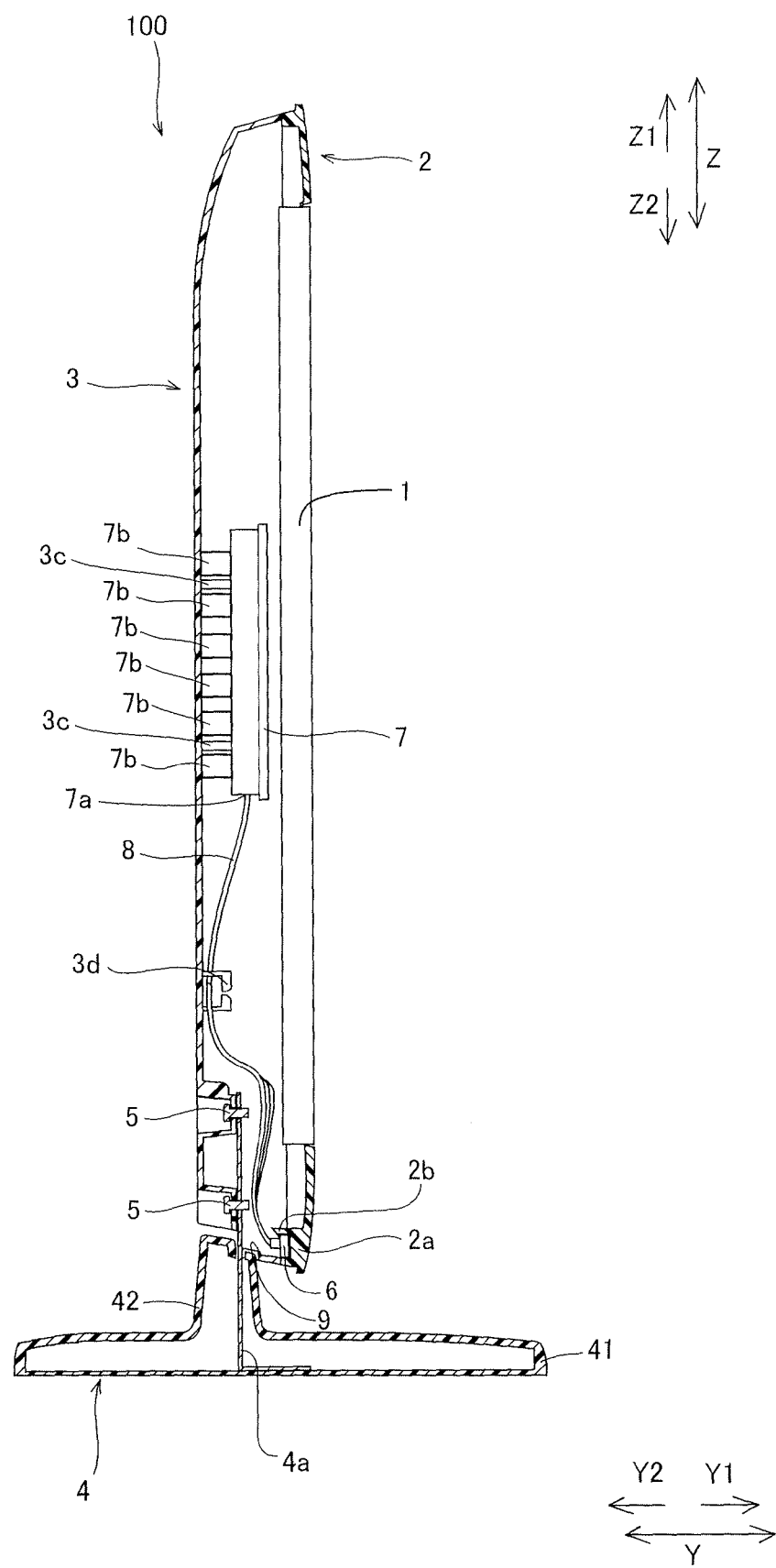
FIG. 3 is a sectional view taken along the line 200-200 in FIG. 2.
Figure 4:
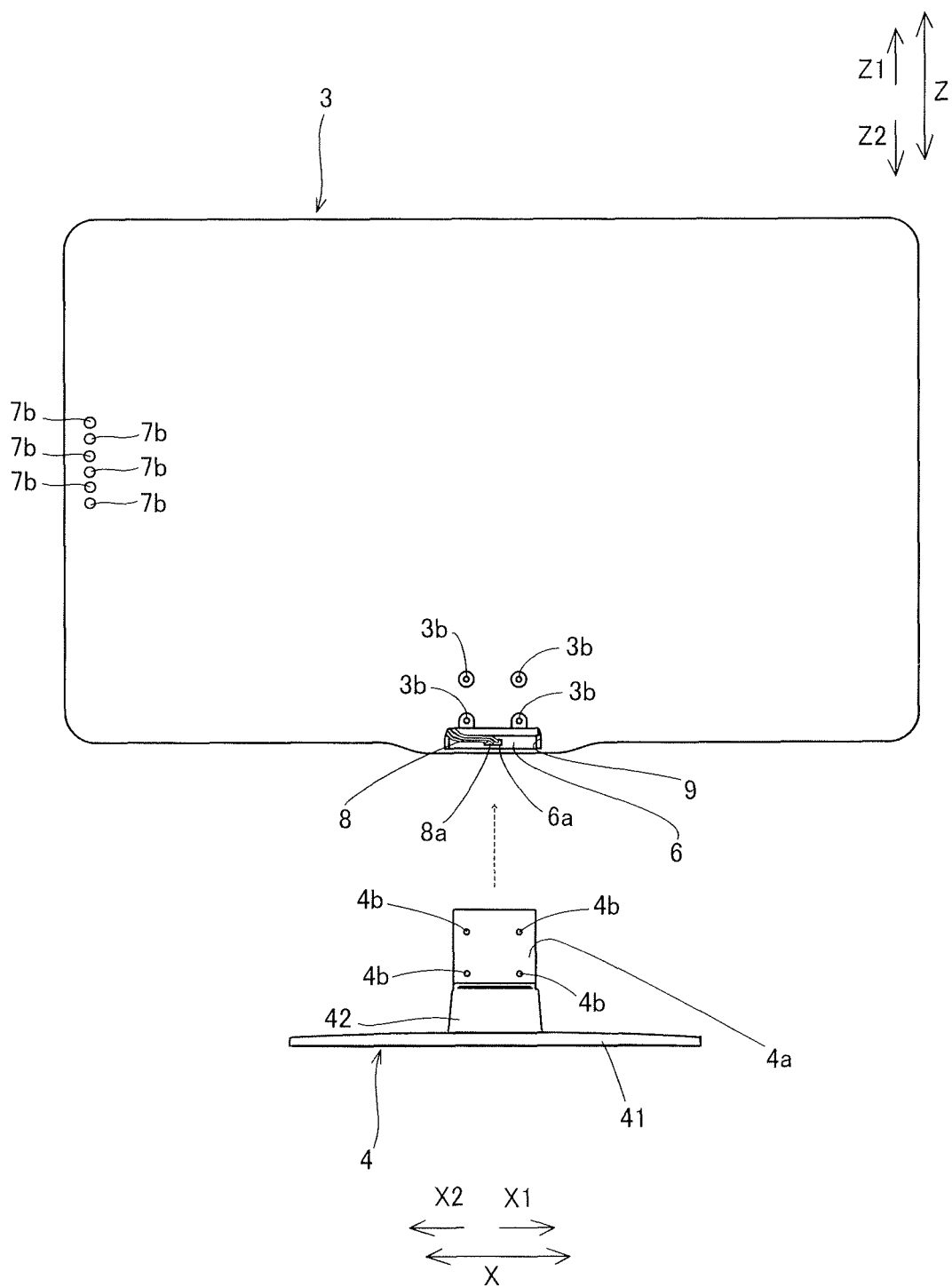
FIG. 4 is a rear elevational view of the liquid crystal television set according to the embodiment of the present invention in a state where a stand is detached.

The rear cabinet 3 is arranged on a back surface side of the liquid crystal television set 100 (a side of the liquid crystal television set 100 in a direction Y2), as shown in FIG. 1. More specifically, the rear cabinet 3 is arranged closer to the back surface side than the front cabinet 2 (on a side of the front cabinet 2 in the direction Y2). The rear cabinet 3 is formed by a resin member and formed in a recessed shape concaved in the direction Y2, as shown in FIG. 3. As shown in FIG. 4, circular four through-holes 3b are formed in the vicinity of a central portion of an end of the rear cabinet 3 in a direction Z2. More specifically, the four through-holes 3b are provided at prescribed intervals from each other in a direction X and a direction Z on the central portion in a direction X in the vicinity of the end of the rear cabinet 3 in the direction Z2. The rear cabinet 3 is mounted with a switching board 7 loaded with switches 7b for operating a power supply and so on, as described later.

The stand 4 is formed by a resin member and arranged on a central portion of a lower portion of the liquid crystal television set 100, as shown in FIGS. 1 to 4. The stand 4 is constituted by a substantially platelike base portion 41 and a columnar vertical support portion 42. The stand 4 comprises an L-shaped sheet metal 4a inside, as shown in FIG. 3. A short-side portion of the sheet metal 4a is mounted on an inner surface of the base portion 41 of the stand 4, and a longitudinal portion thereof protrudes in a direction Z1 through the vertical support portion of the stand 4. As shown in FIG. 4, the longitudinal portion of the sheet metal 4a is formed with through-holes 4b. More specifically, the four through-holes 4b are provided and arranged at positions corresponding to the respective through-holes 3b of the rear cabinet 3. The sheet metal 4a is mounted on a central portion of a lower end of the rear cabinet 3 with screw members 5 (see FIGS. 2 and 3) passing through the through-holes 3b of the rear cabinet 3 and the through-holes 4b. Thus, the stand 4 is mounted on the central portion of the lower end of the rear cabinet 3.

According to the embodiment, the sensor board 6 mounted on a back surface (a surface in the direction Y2) of the front cabinet 2 and the switching board 7 mounted on a front surface (a surface in the direction Y1) of the rear cabinet 3 are connected with each other through a cable 8 in the liquid crystal television set 100, as shown in FIG. 3. The sensor board 6 is an example of the "first board" in the present invention, and the switching board 7 is an example of the "second board" in the present invention. The cable 8 is an example of the "connecting wire" in the present invention.

Figure 5:
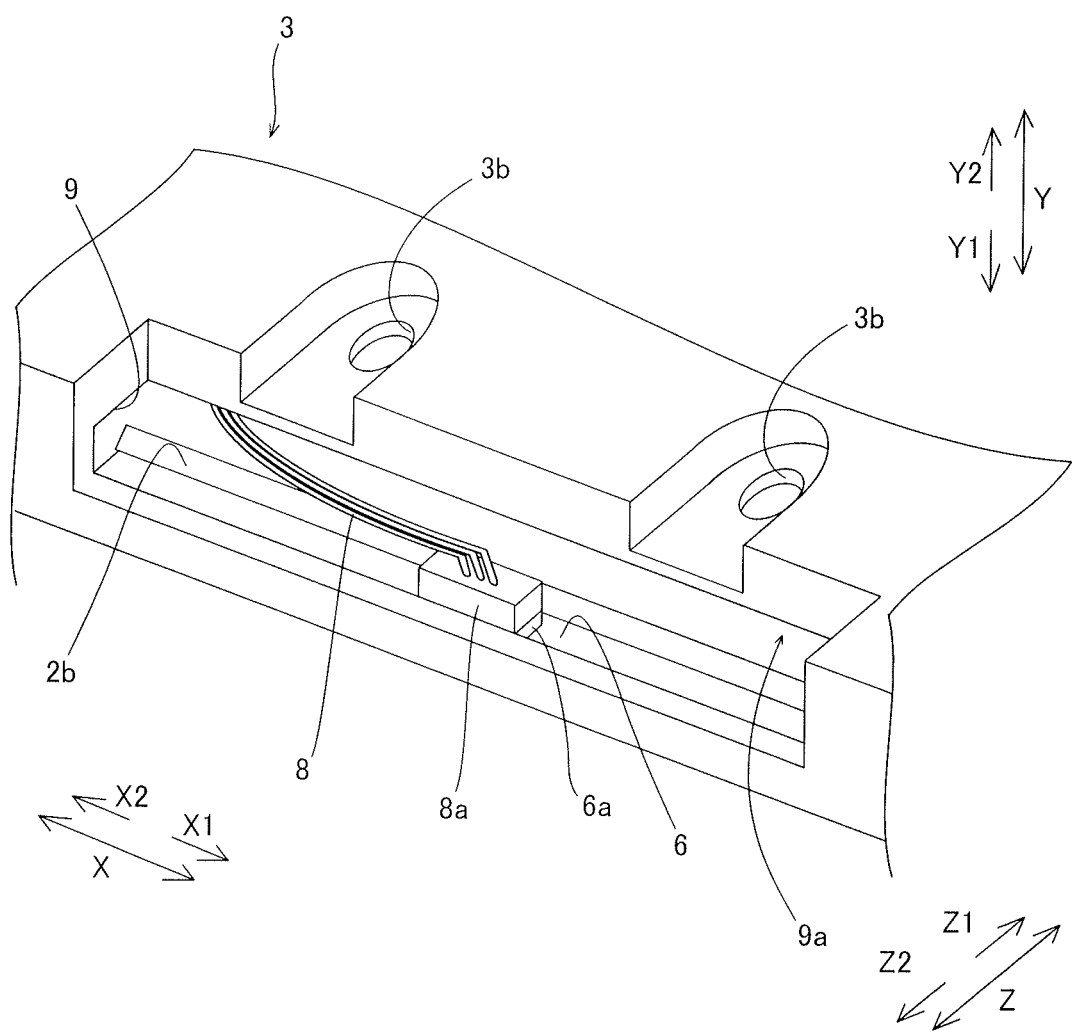
FIG. 5 is an enlarged perspective view showing an exposing portion of the liquid crystal television set according to the embodiment of the present invention.

As shown in FIGS. 3 and 5, a concave stand mounting portion 9a for mounting the stand 4 to the rear cabinet 3 is provided on the central portion in the direction X in the vicinity of the end of the rear cabinet 3 in the direction Z2. An opening 9 is formed in the stand mounting portion 9a. This opening 9 is formed astride a back surface (a surface in the direction Y2) and a bottom surface (a surface in the direction Z2) of the rear cabinet 3. More specifically, the opening 9 is formed in the form of a slit as viewed from the direction Y2, as shown in FIG. 4. The opening 9 has a rectangular shape substantially identical in size to the sensor board 6 as viewed from the direction Y2. Therefore, a connector receiving portion 6a provided on a surface of the sensor board 6 in the direction Y2 and a peripheral portion of the connector receiving portion 6a are exposed outward through the opening 9, as shown in FIGS. 4 and 5. The connector receiving portion 6a is an example of the "first connecting portion" in the present invention.

Figure 2:
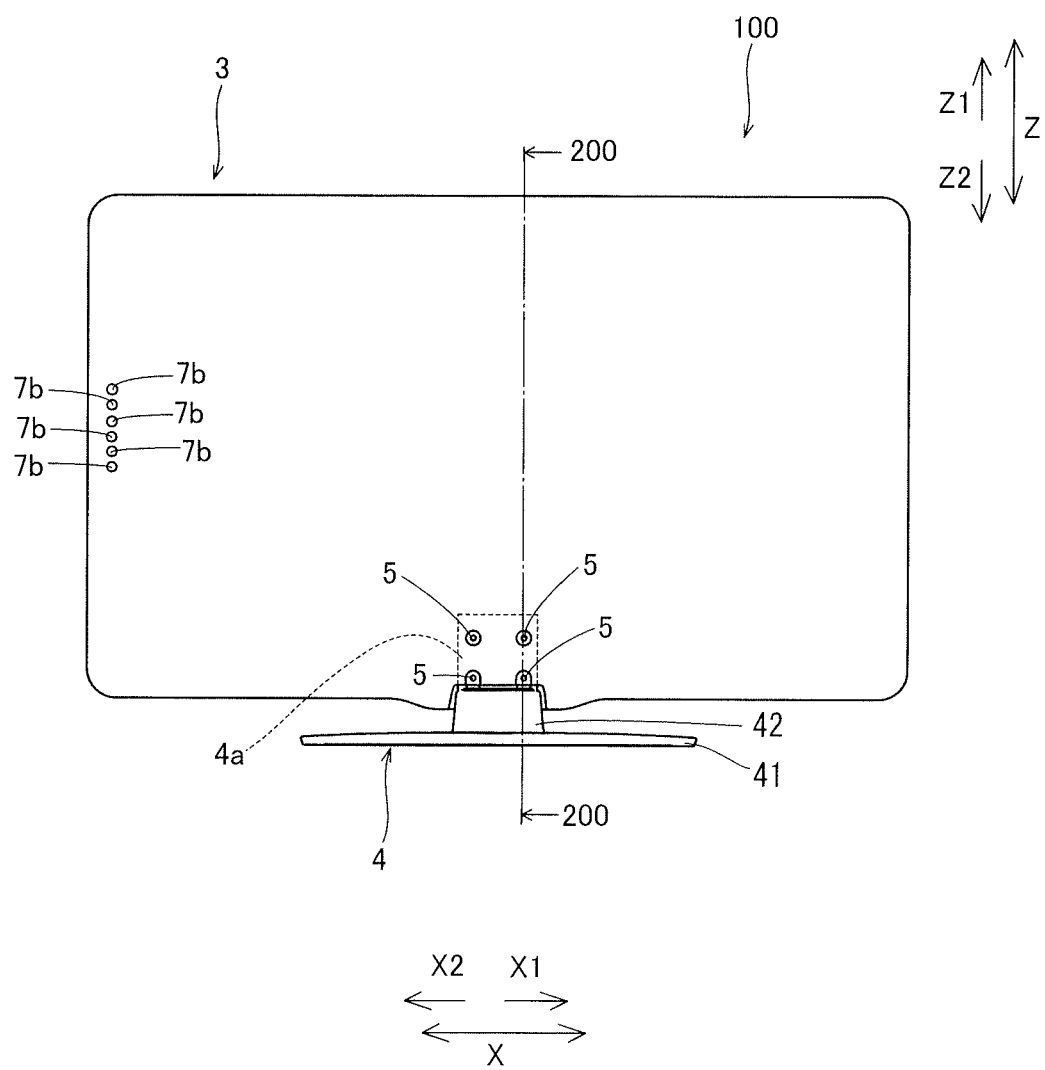
FIG. 2 is a rear elevational view of the liquid crystal television set according to the embodiment of the present invention.

As shown in FIG. 5, the opening 9 is formed in the form of a slit also as viewed from the direction Z2. The opening 9 is formed to be capable of receiving the sheet metal 4a of the stand 4 from the direction Z2 toward the direction Z1. The opening 9 is arranged at a position where it is covered not to be visible externally by mounting the stand 4 to the rear cabinet 3, as shown in FIGS. 2 and 3. The opening 9 is so formed that the cable 8 and a connector 8a described later can be drawn from an inside of the rear cabinet 3 to the outside. The opening 9 is an example of the "exposing portion" in the present invention.

Figure 6:
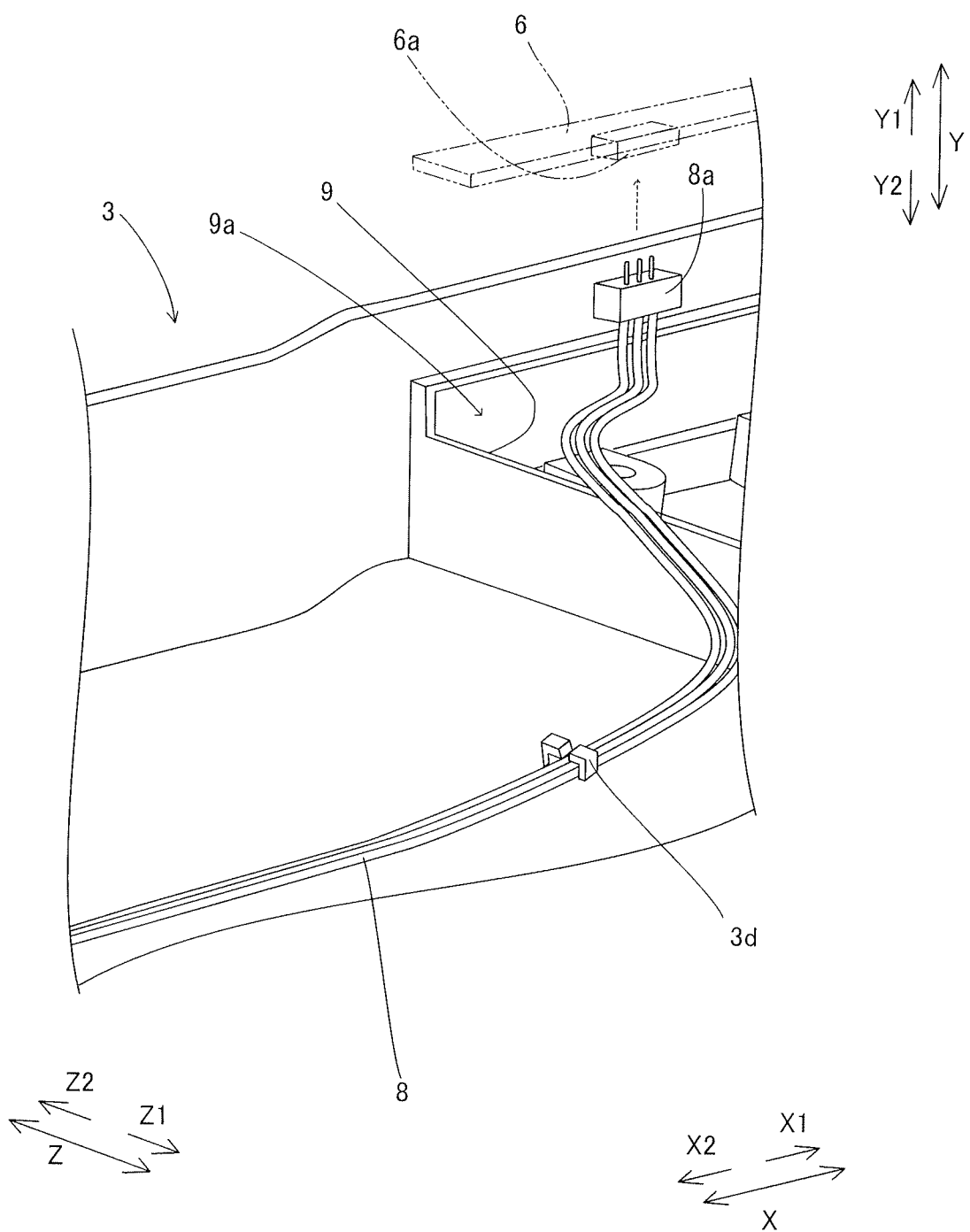
FIG. 6 is a perspective view showing a wiring state in a housing of the liquid crystal television set according to the embodiment of the present invention.
Figure 7:
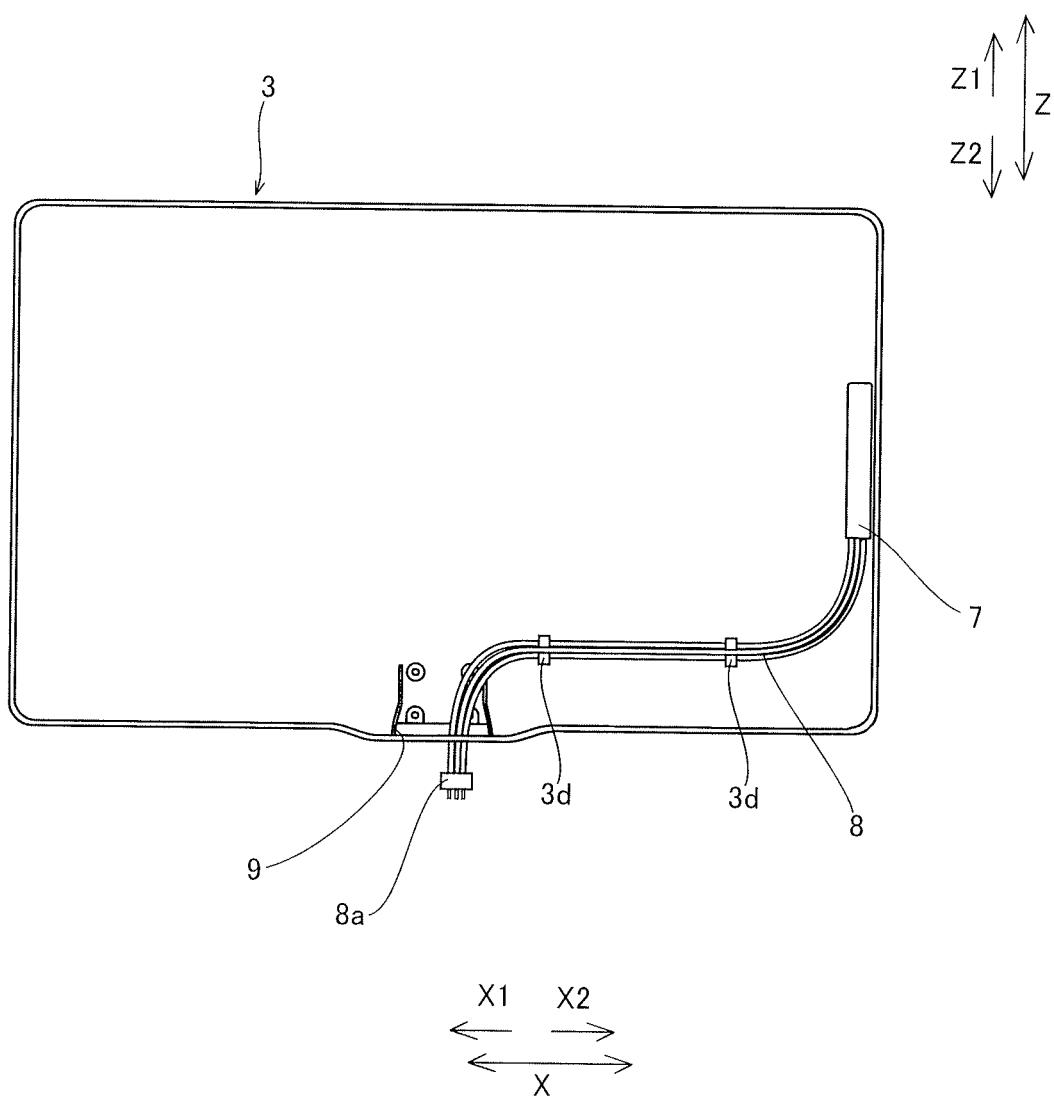
FIG. 7 is a diagram showing an inner surface of a rear cabinet of the liquid crystal television set according to the embodiment of the present invention.
Figure 8:
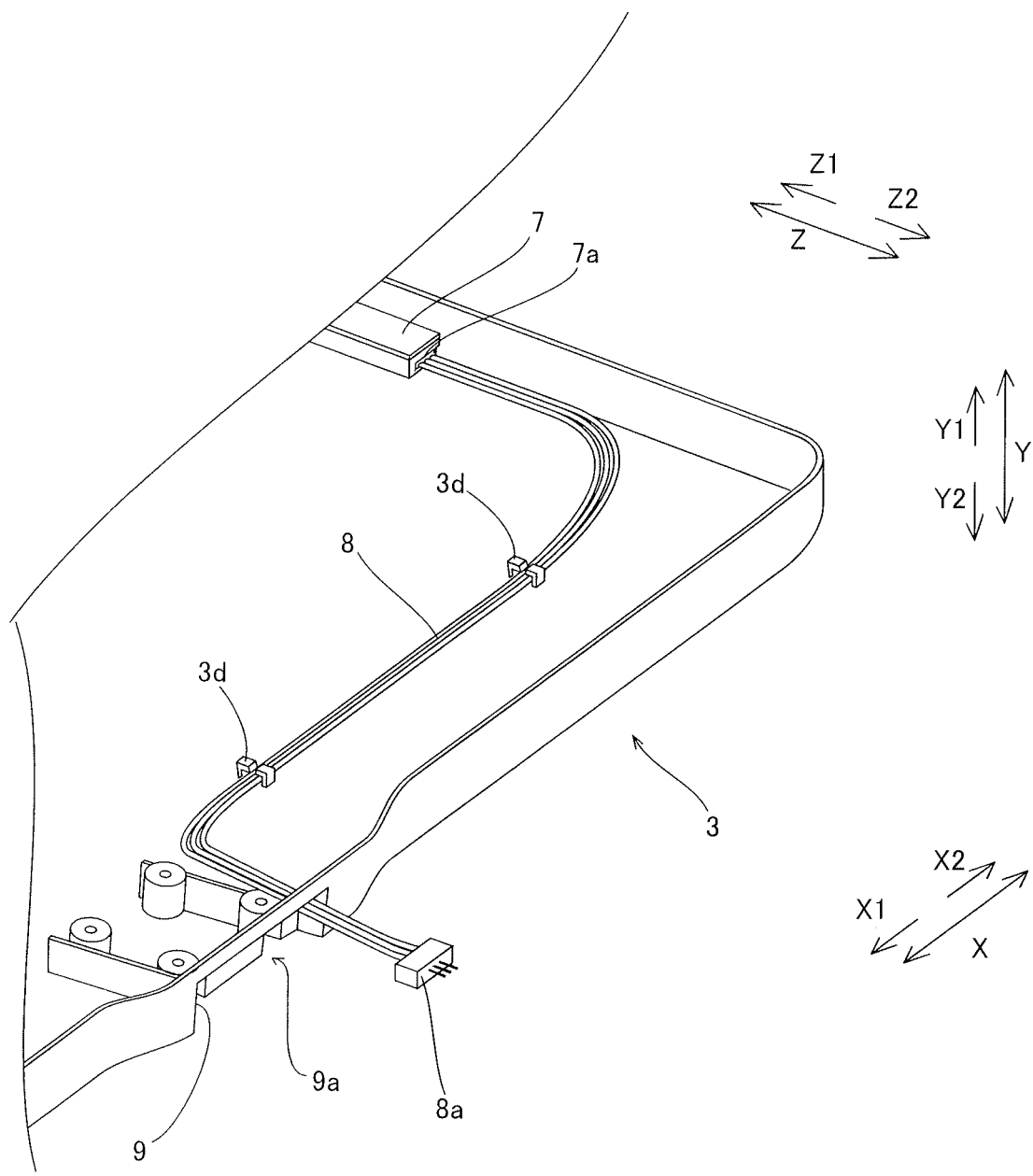
FIG. 8 is a perspective view showing the inner surface of the rear cabinet of the liquid crystal television set according to the embodiment of the present invention.

A wiring path of the cable 8 is fixed with hooks 3d integrally provided on the front surface (the surface in the direction Y1) of the rear cabinet 3, as shown in FIGS. 6 to 8. The hooks 3d each are formed by a pair of upper and lower claw members (along the direction Z) and formed to regulate movement of the cable 8 in a direction Y and the direction Z.

The two hooks 3*d* are provided at a prescribed interval in the direction X at an intermediate height between the opening 9 and the switching board 7 on a side of the opening 9 in a direction X2. The hook 3*d* is an example of the "stop portion" in the present invention.

Figure 9:
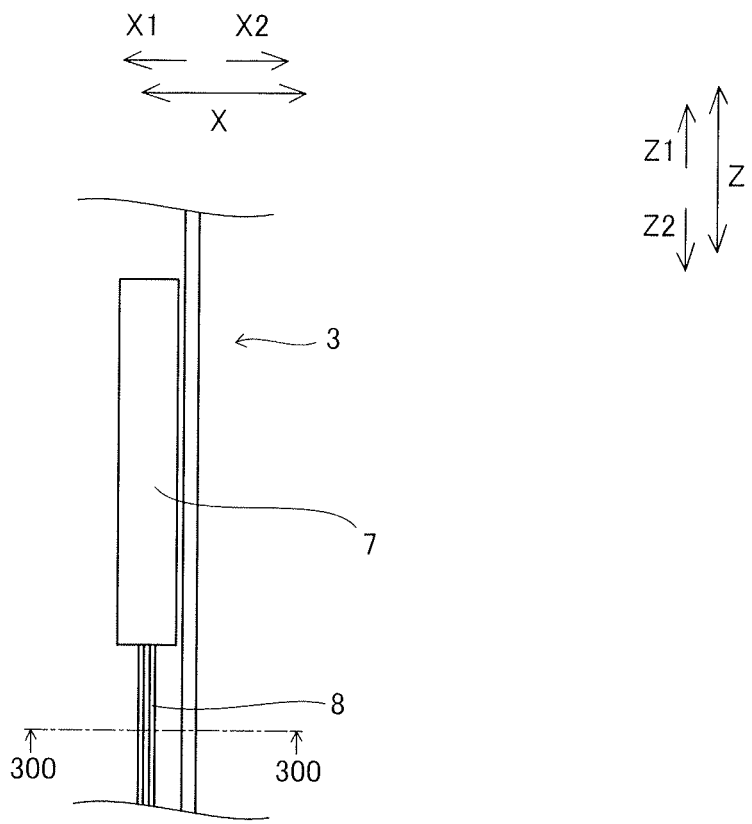
FIG. 9 is an enlarged view showing a switching board of the liquid crystal television set according to the embodiment of the present invention.
Figure 10:
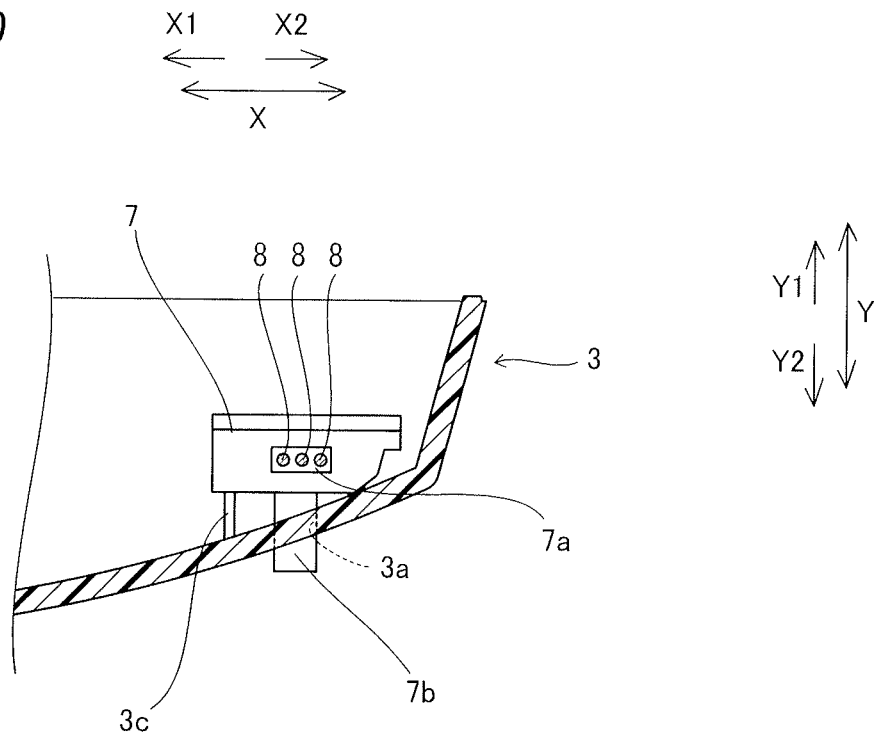
FIG. 10 is a sectional view taken along the line 300-300 in FIG. 9.

As shown in FIGS. 7 to 9, the switching board 7 is mounted on an end of the front surface (the surface in the direction Y1) of the rear cabinet 3 in the direction X2. As shown in FIG. 10, the switching board 7 is supported by a support portion 3*c* protruding in the direction Y1 from the vicinity of the end of the front surface (the surface in the direction Y1) of the rear cabinet 3 in the direction X2. The switches 7*b* for operating a power supply and so on are provided on a surface of the switching board 7 in the direction Y2. The six switches 7*b* are provided to be adjacent to each other in the direction Z, as shown in FIGS. 3 and 4. The switches 7*b* protrude in the direction Y2 from the rear cabinet 3 through six through-holes 3*a* provided on an end of the rear cabinet 3 in the direction X2. As shown in FIG. 8, a cable connecting portion 7*a* provided on an end surface of the switching board 7 in the direction Z2 is connected with a first end of the cable 8, and a second end of the cable 8 is mounted with the connector 8*a*. The connector 8*a* is an example of the "connector portion" in the present invention. The cable connecting portion 7*a*, the cable 8 and the connector 8*a* constitute the "second connecting portion" in the present invention.

Figure 11:
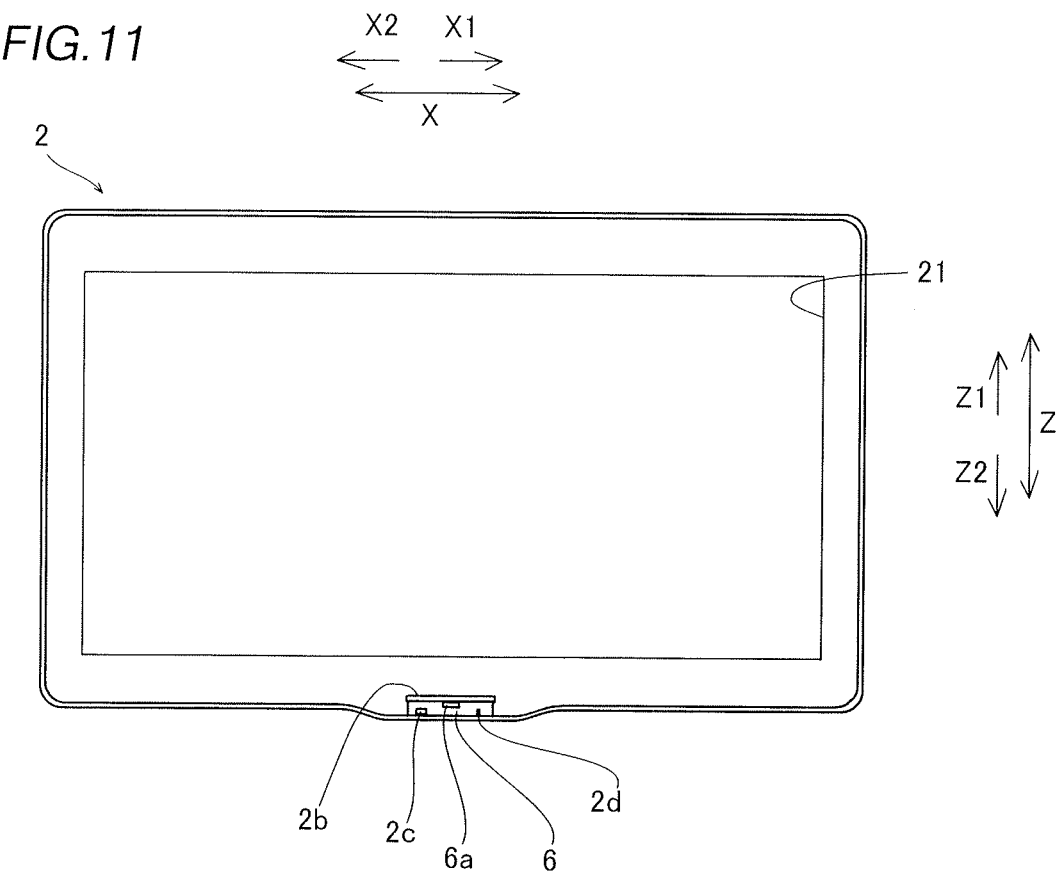
FIG. 11 is a diagram showing an inner surface of a front cabinet of the liquid crystal television set according to the embodiment of the present invention.
Figure 12:
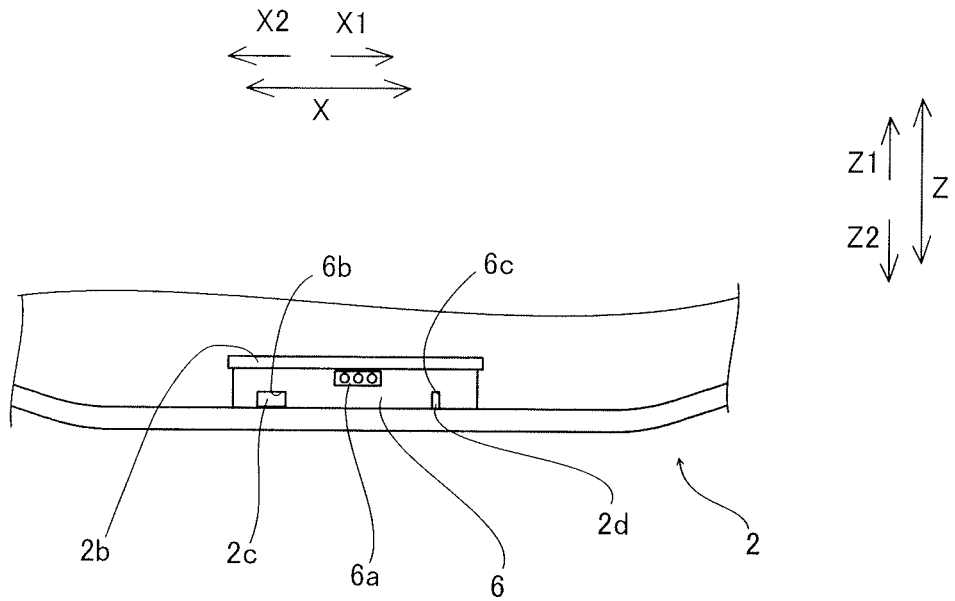
FIG. 12 is an enlarged view showing a sensor board of the liquid crystal television set according to the embodiment of the present invention.

As shown in FIGS. 11 and 12, the sensor board 6 is mounted on a central portion in the direction X in the vicinity of an end of the back surface (the surface in the direction Y2) of the front cabinet 2 in the direction Z2. The sensor board 6 has a substantially rectangular shape as viewed from the direction Y2. As shown in FIG. 12, notches 6*b* and 6*c* are provided on an end of the sensor board 6 in the direction Z2. As shown in FIG. 3, the sensor board 6 is so provided that an end thereof in the direction Y1 comes into contact with a jut portion 2*a* jutting in the direction Y2 from the vicinity of an end of the front cabinet 2 in the direction Z2. The sensor board 6 is held between a claw member 2*b* protruding in the direction Y2 from an upper end of the jut portion 2*a* and protrusions 2*c* and 2*d* protruding in the direction Y2 from a lower end of the jut portion 2*a* from above and from below respectively, as shown in FIG. 12. The sensor board 6 is positioned by fitting the protrusions 2*c* and 2*d* protruding in the direction Y2 from the jut portion 2*a* into the notches 6*b* and 6*c*, respectively. The connector receiving portion 6*a* is provided on the surface of the sensor board 6 in the direction Y2. The connector receiving portion 6*a* is formed to receive the connector 8*a* from the direction Y2 toward the direction Y1, as shown in FIG. 6. In other words, the connector 8*a* can be received from a direction substantially perpendicular to the surface of the sensor board 6 in the direction Y2.

The procedure of assembling the liquid crystal television set 100 according to the embodiment is now described with reference to FIGS. 2 to 13.

First, the sensor board 6 is mounted on the central portion of the end of the back surface (the surface in the direction Y2) of the front cabinet 2 in the direction Z2 with the jut portion 2*a* (see FIG. 3), the claw member 2*b* and the protrusions 2*c* and 2*d* (see FIGS. 11 and 12). As shown in FIGS. 9 and 10, the switching board 7 is mounted in the vicinity of the end of the front surface of the rear cabinet 3 in the direction X2 with the support portion 3*c* and a screw. As shown in FIG. 8, the cable connecting portion 7*a* of the switching board 7 is connected with the first end of the cable 8. The second end of the cable 8 is mounted with the connector 8*a*. As shown in FIGS. 7 and 8, the cable 8 is stopped by the hooks 3*d* of the rear cabinet 3 to be equipped, and the cable 8 and the connector 8*a* are drawn to the outside through the opening 9.

As shown in FIG. 13, the front cabinet 2 and the rear cabinet 3 are mounted to each other. As shown in FIGS. 4 and 5, the connector receiving portion 6*a* of the sensor board 6 exposed outward through the opening 9 receives the connector 8*a* drawn to the outside from the direction Y2 toward the direction Y1, whereby the sensor board 6 and the switching board 7 are electrically connected with each other. After the connection, the cable 8 drawn to the outside through the opening 9 is pushed into a housing. As shown in FIG. 4, the opening 9 receives the sheet metal 4*a* of the stand 4 from the direction Z2 toward the direction Z1. Finally, as shown in FIGS. 2 and 3, the sheet metal 4*a* and the rear cabinet 3 are fixed to each other with the screw members 5, thereby mounting the stand 4 to the rear cabinet 3. The liquid crystal television set 100 according to the embodiment is assembled in this manner.

According to the embodiment, as hereinabove described, the opening 9 for exposing the connector receiving portion 6*a* of the sensor board 6 in a state of being mounted on the front cabinet 2 is provided on the rear cabinet 3, whereby the connector 8*a* of the switching board 7 can be connected to the connector receiving portion 6*a* of the sensor board 6 exposed through the opening 9 from outside the housing (from the side in the direction Y2) even after the front cabinet 2 and the rear cabinet 3 are mounted to each other, and hence the sensor board 6 mounted on the back surface (the surface in the direction Y2) of the front cabinet 2 and the switching board 7 mounted on the front surface (the surface in the direction Y1) of the rear cabinet 3 can be easily connected with each other. According to the embodiment, as hereinabove described, the opening 9 is so formed that the cable 8 and the connector 8*a* can be drawn to the outside. Thus, the connector 8*a* and the cable 8 can be drawn to the outside through the opening 9 when mounting the front cabinet 2 and the rear cabinet 3 to each other, and hence the connector 8*a* can be easily connected to the connector receiving portion 6*a* of the sensor board 6 exposed through the opening 9 from the outside after the front cabinet 2 and the rear cabinet 3 are mounted to each other.

According to the embodiment, as hereinabove described, the connector receiving portion 6*a* is formed to be capable of receiving the connector 8*a* drawn to the outside through the opening 9 from the outside (the side in the direction Y2). Thus, the connector receiving portion 6*a* exposed through the opening 9 simply receives the connector 8*a* drawn to the outside, whereby the connector 8*a* and the connector receiving portion 6*a* can be connected with each other, and hence the connector 8*a* and the connector receiving portion 6*a* can be easily connected with each other.

According to the embodiment, as hereinabove described, the connector receiving portion 6*a* is formed to be capable of receiving the connector 8*a* drawn to the outside through the opening 9 from the outside along the direction (direction Y1) substantially perpendicular to the exposed surface (the surface in the direction Y2) of the sensor board 6. Thus, the connector 8*a* drawn to the outside can be received straight from the front surface side with respect to the exposed surface of the sensor board 6 exposed through the opening 9, and hence the connector 8*a* can be easily connected to the connector receiving portion 6*a*.

According to the embodiment, as hereinabove described, the opening 9 is formed to be substantially identical in size to the sensor board 6 as viewed from the back surface side of the rear cabinet 3 (the side in the direction Y2). Thus, a large space for the work of connecting the connector 8*a* of the switching board 7 and the connector receiving portion 6a of the sensor board 6 with each other can be secured after mounting the front cabinet 2 and the rear cabinet 3 to each other, as compared with a case where the opening 9 is so formed that only the connector receiving portion 6a is exposed as viewed from the back surface side of the rear cabinet 3. Consequently, the connector 8a of the switching board 7 and the connector receiving portion 6a of the sensor board 6 can be easily connected with each other after mounting the front cabinet 2 and the rear cabinet 3 to each other.

When the opening 9 is unduly increased in size, a foreign substance or the like may invade through the opening 9 at the work of connecting the connector 8a and the connector receiving portion 6a with each other. In this case, according to the embodiment, the opening 9 is formed to be substantially identical in size to the sensor board 6 as viewed from the back surface side of the rear cabinet 3, whereby the invasion by a foreign substance or the like through the opening 9 at the connection work can be inhibited while facilitating the connection between the connector 8a of the switching board 7 and the connector receiving portion 6a of the sensor board 6 after mounting the front cabinet 2 and the rear cabinet 3 to each other.

According to the embodiment, as hereinabove described, the opening 9 is formed astride the back surface (the surface in the direction Y2) and the bottom surface (the surface in the direction Z2) of the rear cabinet 3. Thus, a large space for the work of connecting the connector 8a of the switching board 7 and the connector receiving portion 6a of the sensor board 6 with each other can be secured after mounting the front cabinet 2 and the rear cabinet 3 to each other, as compared with a case where the opening 9 is formed on only either the back surface or the bottom surface of the rear cabinet 3. Consequently, the connector 8a of the switching portion 7 and the connector receiving portion 6a of the sensor board 6 can be easily connected with each other after mounting the front cabinet 2 and the rear cabinet 3 to each other.

According to the embodiment, as hereinabove described, the stand 4 is formed to cover the opening 9 in a state of being mounted to the rear cabinet 3. Thus, the opening 9 is covered by the stand 4, whereby the invasion by a foreign substance or the like through the opening 9 can be prevented and the opening 9 can be prevented from standing out, while facilitating the connection between the board mounted on the back surface of the front cabinet 2 and the board mounted on the front surface of the rear cabinet 3 through the opening 9.

According to the embodiment, as hereinabove described, the stand 4 is formed to be mounted to the rear cabinet 3. Thus, the stand 4 can be mounted to the liquid crystal television set 100 while inhibiting complication of the structure of the front cabinet 2 provided with the display portion 1 or the like.

According to the embodiment, as hereinabove described, the stand mounting portion 9a for mounting the stand 4 is formed at a position where the opening 9 of the rear cabinet 3 is provided. Thus, the stand mounting portion 9a is not required to be formed separately at a position different from the position where the opening 9 of the rear cabinet 3 is provided, and hence the stand 4 can be mounted to the rear cabinet 3 while inhibiting complication of the structure of the rear cabinet 3.

According to the embodiment, as hereinabove described, the stand mounting portion 9a is formed in a recessed shape. Thus, a backward protrusion from the back surface of the rear cabinet 3 at a mounting portion can be reduced when mounting the stand 4 on the stand mounting portion 9a, and hence a thickness of a body of the liquid crystal television set 100 can be reduced.

According to the embodiment, as hereinabove described, the opening 9 is arranged on the lower end (the end in the direction Z2) of the rear cabinet 3, and the stand 4 is mounted to cover the opening 9. Thus, the liquid crystal television set 100 can be easily supported from below by the stand 4 mounted on the lower end of the rear cabinet 3.

According to the embodiment, as hereinabove described, the opening 9 is arranged on the central portion of the lower end (the central portion in the direction X of the end in the direction Z2) of the rear cabinet 3. Thus, the housing can be stably supported by the stand 4 mounted on the central portion of the lower end of the rear cabinet 3 where the center of gravity of the housing is located, while covering the opening 9.

According to the embodiment, as hereinabove described, the hooks 3d for fixing the wiring path of the cable 8 are provided on the rear cabinet 3. Thus, the hooks 3d can inhibit the cable 8 from deviating from a desired wiring path.

According to the embodiment, as hereinabove described, the hooks 3d are integrally provided on the rear cabinet 3. Thus, the hooks 3d integrally provided on the rear cabinet 3 can inhibit the cable 8 from deviating from a desired wiring path without any additional component.

According to the embodiment, as hereinabove described, the hooks 3d each are formed by the pair of upper and lower claw members and formed to regulate anteroposterior movement (movement in the direction Y) and vertical movement (movement in the direction Z) of the cable 8, whereby the wiring path of the cable 8 is fixed. Thus, the hooks 3d formed by the pair of upper and lower claw members regulating the anteroposterior and vertical movement of the cable 8 can reliably inhibit the cable 8 from deviating from a desired wiring path.

Although the present invention has been described and illustrated in detail, it is clearly understood that the same is by way of illustration and example only and is not to be taken by way of limitation, the spirit and scope of the present invention being limited only by the terms of the appended claims.

For example, while the liquid crystal television set 100 is shown as an exemplary television set in the aforementioned embodiment, the present invention is not restricted to this. The present invention may alternatively be applied to another television set other than the liquid crystal television set 100, so far as the same has a board of a front housing and a board of a rear housing connected with each other.

While the opening 9 serving as the exposing portion is so formed that the connector receiving portion 6a serving as the first connecting portion and the peripheral portion of the connector receiving portion 6a are exposed outward in the aforementioned embodiment, the present invention is not restricted to this. In the present invention, only the first connecting portion (connector receiving portion 6a) of the first board is required to be exposed, and portions other than the first connecting portion (connector receiving portion 6a) may not be exposed.

While the opening 9 is formed in the form of a slit in the aforementioned embodiment, the present invention is not restricted to this. In the present invention, the opening serving as the exposing portion may alternatively be formed in the form of a notch not in the form of a slit.

While the opening 9 serving as the exposing portion is formed in a rectangular shape as viewed from the direction Y2 in the aforementioned embodiment, the present invention is not restricted to this. In the present invention, the exposing portion may alternatively be formed in an elliptical shape as viewed from the direction Y2, for example.

While the opening 9 serving as the exposing portion is so formed that the cable 8 serving as the connecting wire and the connector 8a serving as the connector portion can be drawn to the outside in the aforementioned embodiment, the present invention is not restricted to this. In the present invention, the liquid crystal television set may be so formed that only the connector portion can be drawn to the outside through the exposing portion. Further, in the present invention, an opening or a notch may be formed on the front housing or the rear housing independently of the exposing portion, and the liquid crystal television set may be so formed that the connecting wire can be drawn to the outside through the independently formed opening or notch.

While the connector receiving portion 6a capable of receiving the connector 8a serving as the connector portion from the direction substantially perpendicular to the exposed surface of the sensor board 6 serving as the first board is shown as an exemplary first connecting portion in the aforementioned embodiment, the present invention is not restricted to this. In the present invention, the first connecting portion may alternatively be capable of receiving the connector portion from a direction other than the direction substantially perpendicular to the exposed surface of the first board, for example.

While the opening 9 serving as the exposing portion is covered by the stand 4 in the aforementioned embodiment, the present invention is not restricted to this. In the present invention, the exposing portion may alternatively be covered by a member other than the stand. Alternatively, the exposing portion may not be covered after assembling.

While the stand 4 is mounted to the rear cabinet 3 serving as the rear housing in the aforementioned embodiment, the present invention is not restricted to this. In the present invention, the stand may alternatively be mounted to the front housing. Alternatively, the stand may be mounted astride both the front housing and the rear housing.

While the sensor board 6 serving as the first board is provided on the central portion of the lower end of the front cabinet 2 serving as the front housing, and the opening 9 serving as the exposing portion is provided on the central portion of the lower end of the rear cabinet 3 serving as the rear housing in the aforementioned embodiment, the present invention is not restricted to this. In the present invention, the first board and the exposing portion may alternatively be provided on locations other than the central portions of the lower ends, so far as the first connecting portion of the first board is exposed from the exposing portion.

While the hooks 3d each formed by the pair of upper and lower claw members and serving as the stop portion are provided to fix the wiring path of the cable 8 serving as the connecting wire in the aforementioned embodiment, the present invention is not restricted to this. In the present invention, the wiring path of the connecting wire may alternatively be fixed with ring-shaped stop portions other than the hooks each formed by the pair of upper and lower claw members, for example.

While the two hooks 3d each serving as the stop portion are provided in the aforementioned embodiment, the present invention is not restricted to this. In the present invention, the single stop portion may alternatively be provided, or the three or more stop portions may alternatively be provided.

While the sensor board 6 is the first board, and the switching board 7 is the second board in the aforementioned embodiment, the present invention is not restricted to this. In the present invention, the first board may alternatively be a board other than the sensor board, and the second board may alternatively be a board other than the switching board.

What is claimed is:

1. A television set comprising:
   a front cabinet so arranged that a display portion capable of displaying television broadcasting is exposed on a front surface side;
   a first board mounted on a back surface of said front cabinet, having a first connecting portion;
   a rear cabinet mounted to said front cabinet; and
   a second board mounted on a front surface of said rear cabinet, having a second connecting portion connected to said first connecting portion, wherein
   said rear cabinet includes an exposing portion formed by an opening or a notch for exposing outward at least said first connecting portion of said first board on a side of a back surface of said rear cabinet in a state that said rear cabinet is mounted to said front cabinet, and said exposing portion is formed on the side of the back surface of said rear cabinet.

2. The television set according to claim 1, wherein
   said second connecting portion includes a connecting wire and a connector portion both for connecting to said first connecting portion, and
   said exposing portion is so formed that at least said connector portion can be drawn to an outside.

3. The television set according to claim 2, wherein
   said exposing portion is so formed that said connecting wire and said connector portion can be drawn to the outside.

4. The television set according to claim 3, wherein
   said first connecting portion is formed to be capable of receiving said connector portion drawn to the outside through said exposing portion from the outside.

5. The television set according to claim 4, wherein
   said first connecting portion is formed to be capable of receiving said connector portion drawn to the outside through said exposing portion from the outside along a direction substantially perpendicular to an exposed surface of said first board.

6. The television set according to claim 1, wherein
   said exposing portion is formed by an opening, and
   said opening is substantially identical in size to said first board as viewed from a back surface side of said rear cabinet.

7. The television set according to claim 6, wherein
   said opening is formed astride a back surface and a bottom surface of said rear cabinet.

8. The television set according to claim 1, further comprising a stand mounted to at least either said front cabinet or said rear cabinet, formed to cover said exposing portion in a mounted state.

9. The television set according to claim 8, wherein
   said stand is formed to be mounted to said rear cabinet.

10. The television set according to claim 8, wherein
    said exposing portion is formed by an opening, and
    said rear cabinet includes a stand mounting portion formed at a position where said exposing portion formed by said opening is provided, mounted with said stand.

11. The television set according to claim 10, wherein
    said stand mounting portion is formed in a recessed shape.

12. The television set according to claim 8, wherein
    said exposing portion is arranged on a lower end of said rear cabinet, and said stand is mounted to cover said exposing portion.

13. The television set according to claim 12, wherein
    said exposing portion is arranged on a central portion of the lower end of said rear cabinet.

14. The television set according to claim 1, wherein
said second connecting portion includes a connecting wire and a connector portion both for connecting to said first connecting portion, and
said rear cabinet is provided with a stop portion for fixing a wiring path of said connecting wire.

15. The television set according to claim 14, wherein
said stop portion is integrally provided on said rear cabinet.

16. The television set according to claim 14, wherein
said stop portion is formed by a pair of upper and lower claw members and formed to fix said wiring path of said connecting wire by regulating anteroposterior and vertical movement of said connecting wire.

17. The television set according to claim 1, wherein
said first board is a sensor board including a remote photo receiving portion, and
said second board is a switching board loaded with a plurality of switches including a switch for operating a power supply.

18. The television set according to claim 1, wherein
said rear cabinet is mounted to said front cabinet so as to cover the back surface of said cabinet.

\* \* \* \* \*